(12) United States Patent
Rusch

(10) Patent No.: US 11,953,022 B2
(45) Date of Patent: Apr. 9, 2024

(54) STABILIZER CHANNEL OF A COMPRESSOR

(71) Applicant: TURBO SYSTEMS SWITZERLAND LTD., Baden (CH)

(72) Inventor: Daniel Rusch, Wettingen (CH)

(73) Assignee: Turbo Systems Switzerland Ltd., Baden (CH)

( * ) Notice: Subject to any disclaimer, the term of this patent is extended or adjusted under 35 U.S.C. 154(b) by 0 days.

(21) Appl. No.: 17/797,908

(22) PCT Filed: Feb. 2, 2021

(86) PCT No.: PCT/EP2021/052430
§ 371 (c)(1),
(2) Date: Aug. 5, 2022

(87) PCT Pub. No.: WO2021/156251
PCT Pub. Date: Aug. 12, 2021

(65) Prior Publication Data
US 2023/0071034 A1    Mar. 9, 2023

(30) Foreign Application Priority Data
Feb. 7, 2020 (EP) .................................... 20156161

(51) Int. Cl.
*F04D 29/42* (2006.01)
*F04D 29/68* (2006.01)

(52) U.S. Cl.
CPC ....... *F04D 29/4213* (2013.01); *F04D 29/682* (2013.01); *F04D 29/685* (2013.01); *F05D 2220/40* (2013.01)

(58) Field of Classification Search
CPC .. F04D 29/4213; F04D 29/682; F04D 29/685; F05D 2220/40; Y02T 10/12
(Continued)

(56) References Cited

U.S. PATENT DOCUMENTS 10,968,922 B2 * 4/2021 Thaser ................... F04D 29/685
11,066,982 B2 * 7/2021 Tomita ................... F04D 29/284
(Continued)

FOREIGN PATENT DOCUMENTS

BE    1017069 A3    1/2008
DE    10105456 A1   8/2002
(Continued)

OTHER PUBLICATIONS

Extended European Search Report in European Application No. 20156161.0, dated Jul. 17, 2020, 8 pages.
(Continued)

*Primary Examiner* — J. Todd Newton
(74) *Attorney, Agent, or Firm* — Meunier Carlin & Curfman LLC

(57) ABSTRACT

The invention relates to a stabilizer channel, in particular of a radial compressor or diagonal compressor, having an annular stabilizer chamber which encloses a main flow channel in the intake region of a compressor wheel and is delimited from the main flow channel by an annular bridge. The annular stabilizer chamber is bladeless and is connected to the main flow channel via a downstream inlet channel and an upstream outlet channel. A plurality of flow directing elements are arranged in the downstream inlet channel. The downstream inlet channel is arranged between an upstream part of the annular bridge and a downstream part of the annular bridge. The invention furthermore relates to a compressor, in particular a radial compressor or diagonal compressor, comprising the stabilizer channel according to the invention and to a turbocharger comprising the compressor.

20 Claims, 6 Drawing Sheets

(58) Field of Classification Search
USPC .......................................................... 415/206
See application file for complete search history.

(56) References Cited

U.S. PATENT DOCUMENTS

2013/0343886 A1* 12/2013 Karim ................. F04D 29/4213
            415/208.1
2020/0271045 A1* 8/2020 Tomita ................ F04D 29/4213

FOREIGN PATENT DOCUMENTS

| EP | 2434165 | A1 | 3/2012 |
| SU | 478957 | A2 | 7/1975 |

OTHER PUBLICATIONS

English Translation of International Search Report in International Application No. PCT/EP2021/052430, dated Mar. 29, 2021, 2 pages.
International Search Report and Written Opinion in International Application No. PCT/EP2021/052430, dated Mar. 29, 2021, 6 pages.

* cited by examiner

STABILIZER CHANNEL OF A COMPRESSOR

CROSS-REFERENCE TO RELATED APPLICATION

This application is a 371 of international application PCT/EP2021/052430 filed Feb. 2, 2021, which claims priority to EP 20156161.0 filed Feb. 7, 2020.

TECHNICAL FIELD

The invention relates to the field of compressors, in particular radial compressors and diagonal compressors. In particular, the invention relates to a stabilizer channel at the compressor inlet for enhancing the map width and the characteristic curve gradient of a compressor stage.

TECHNICAL BACKGROUND

Exhaust-gas turbochargers are used to increase the performance of internal combustion engines, in particular reciprocating piston engines. An exhaust-gas turbocharger usually has a radial or diagonal compressor and a radial or axial turbine.

The practicable operating range of radial and diagonal compressors is limited towards smaller mass flows by the surge limit/flow instability: when the compressor is throttled, the incidence angles increasingly deteriorate until the flow separates and pumping occurs. The permissible incidence angle range at which flow still occurs decreases as the flow Mach number increases. That is to say, the map width tends to decrease in the case of stages with a high pressure ratio and/or high suction capacity.

As a measure for stabilizing the characteristic curve, a bypass in the form of an annular cavity can be provided within the compressor housing over the wheel contour of the compressor wheel, parallel to the intake channel. Such a bypass is also known as a stabilizer chamber or recirculator. By using a recirculator, the mass flow at the compressor wheel inlet can be artificially increased close to the surge limit. A portion of the mass flow is branched from the compressor wheel into the side chamber (bypass). This mass flow has a high swirl component (in the direction of rotation of the impeller—co-swirl). This co-swirl has the result that the work rate in the compressor is reduced, which leads to flat characteristic curves close to the surge limit.

Flat characteristic curves close to the surge limit can lead to unexpected pumping in applications with pressure pulsation (e.g. caused by the valve movement of the supercharged combustion engine). For this reason, there is a requirement to provide a minimum pressure increase between the operating point and the surge limit point on the operating speed curve. In the case of stages with a high pressure ratio and a conventional bypass/stabilizer channel this requirement can scarcely be met—owing to the high work rate and the flat work coefficient profile over the mass flow at constant speed.

BRIEF DESCRIPTION OF THE INVENTION

The object of the present invention is to provide a stabilizer channel of a compressor, in particular of a radial compressor or diagonal compressor, which is improved at least in respect of one of the disadvantages known from the prior art. The object of the present invention further consists in providing an improved compressor and an improved turbocharger.

In order to achieve the above-mentioned objects, a stabilizer channel of a compressor, in particular of a radial compressor or diagonal compressor, according to independent claim 1 is provided. A compressor having a stabilizer channel according to the embodiments described herein and a turbocharger having such a compressor are further provided.

Further aspects, advantages and features of the present invention are to be found in the dependent patent claims, the description and the accompanying figures.

According to one aspect of the invention, a stabilizer channel of a compressor, in particular of a radial compressor or diagonal compressor, is provided. The stabilizer channel comprises an annular stabilizer chamber which surrounds a main flow channel in the intake region of a compressor wheel and is delimited with respect to the main flow channel by an annular web. The annular stabilizer chamber is free of vanes and is connected via a downstream inlet channel and an upstream outlet opening. A plurality of flow-guiding elements are arranged in the downstream inlet channel. The downstream inlet channel is arranged between an upstream part of the annular web and a downstream part of the annular web.

Accordingly, a stabilizer channel which permits an enhancement of the map width and of the characteristic curve gradient of a compressor stage is advantageously provided. Furthermore, by means of the stabilizer channel according to the invention having flow-guiding elements in the downstream inlet channel, a stabilizer channel which has advantages over conventional stabilizers known from the prior art in respect of component integration, containment properties and production costs can be provided.

According to a second aspect of the invention there is provided a compressor, in particular a radial compressor or a diagonal compressor, which comprises a compressor wheel and a stabilizer channel according to one of the embodiments described herein. Accordingly, a compressor with an enhanced map width and characteristic curve gradient can advantageously be provided.

A third aspect of the invention relates to a turbocharger having a compressor according to one of the embodiments described herein, so that a turbocharger which is improved over the prior art is advantageously provided.

BRIEF DESCRIPTION OF THE FIGURES

The invention will be explained hereinbelow by means of exemplary embodiments which are shown in figures and from which further advantages and modifications follow. In the figures:

FIG. 4b is an enlarged view of a detail of FIG. 4a;

FIG. 7 is a schematic view of a configuration of flow-guiding elements for generating a flow counter-swirl when the guiding elements are flowed through; and FIG. 8 is a schematic view of a configuration of flow-guiding elements for reducing a flow swirl when the guiding elements are flowed through.

DETAILED DESCRIPTION OF THE FIGURES

Figure 1:
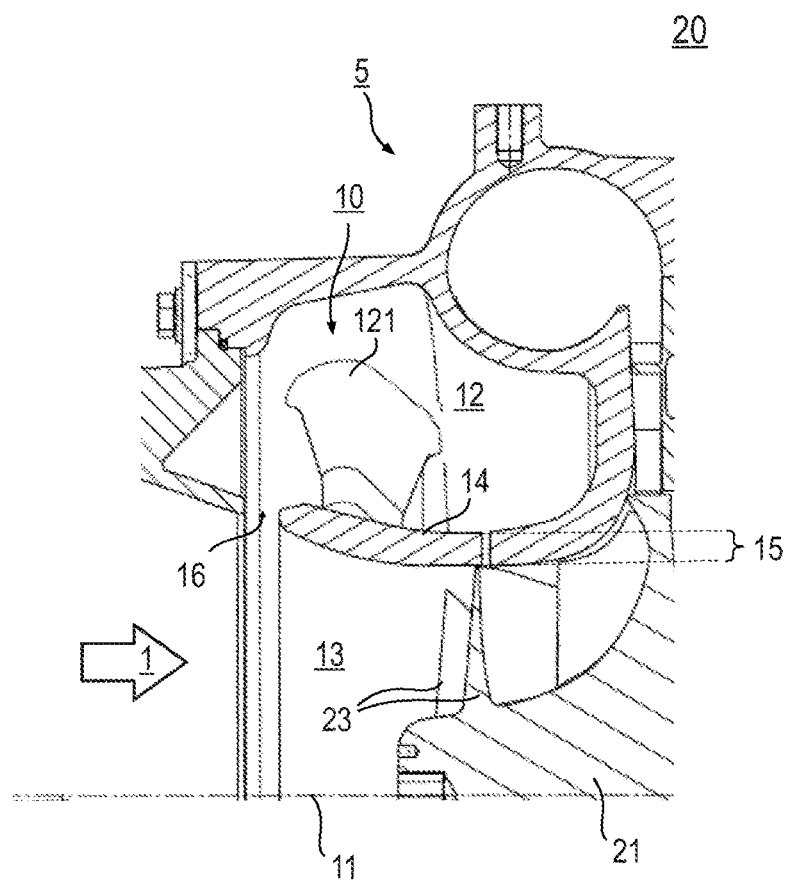
FIG. 1 is a schematic view of a stabilizer channel according to the prior art.

FIG. 1 is a schematic view of a stabilizer channel 10 according to the prior art. In particular, FIG. 1 shows a section along the axis of rotation 11 of the compressor wheel 21 through a housing of a radial compressor as is used, for example, for compressing air in exhaust-gas turbochargers. A stabilizer chamber 12 is arranged in the compressor housing 5. The stabilizer chamber 12 is connected to the main flow channel 13 via an inlet channel 15 and an outlet opening 16. The stabilizer chamber 12 is delimited with respect to the main flow channel 13 by means of an annular web 14. Holding ribs 121 which connect the annular web 14 to the compressor housing are arranged in the stabilizer chamber 12.

A stabilizer channel of a compressor according to the present disclosure will be described with reference to FIGS. 2 to 8. The compressor can be a radial compressor or a diagonal compressor.

According to one embodiment, which can be combined with other embodiments described herein, the stabilizer channel 10 comprises an annular stabilizer chamber 12 which surrounds a main flow channel 13 in the intake region of a compressor wheel 21. In other words, the stabilizer channel 10 is typically arranged at the compressor inlet. It should be noted in this context that, in the present disclosure, a "stabilizer channel" is to be understood as being in particular a channel in the compressor inlet which is configured to enhance a map width of a compressor stage. For example, the stabilizer channel 10 can be a recirculation channel.

Figure 2:
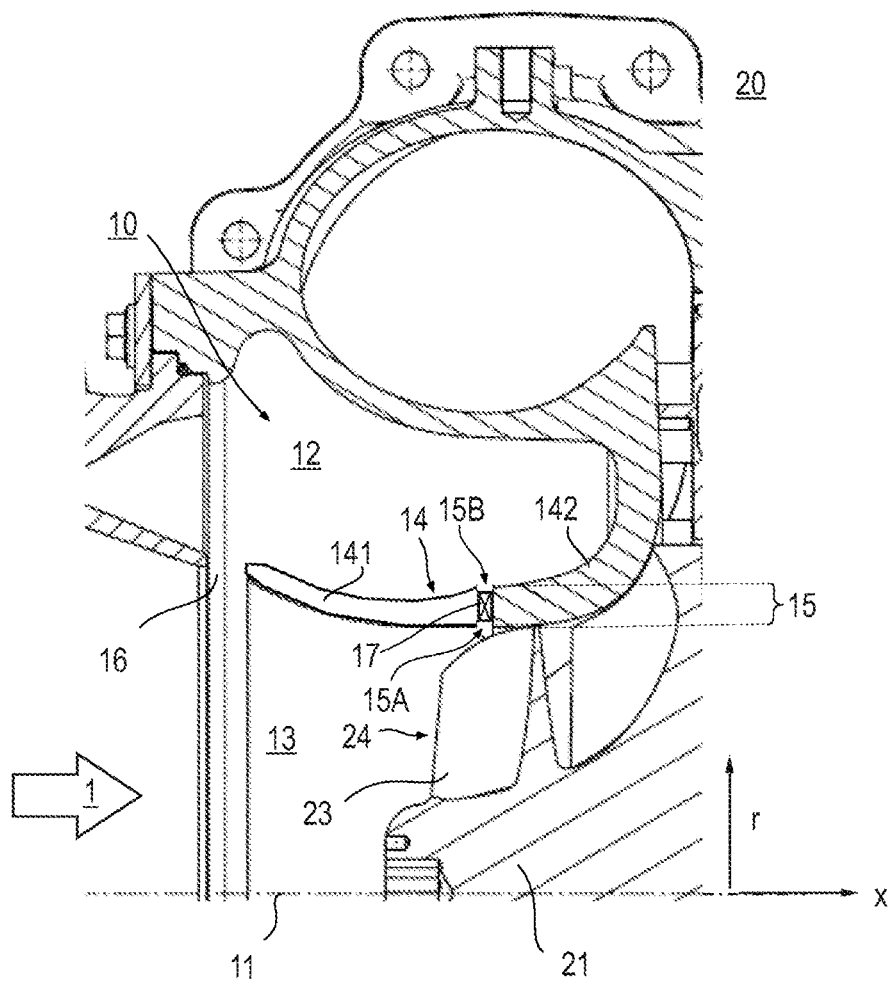
FIG. 2 is a schematic view of a stabilizer channel according to embodiments described herein.

The annular stabilizer chamber 12 is furthermore delimited with respect to the main flow channel 13 by an annular web 14, as is shown by way of example in FIG. 2. The annular stabilizer chamber 12 is free of vanes. In other words, no vanes, in particular no flow-guiding vanes, are arranged in the annular stabilizer chamber 12. In particular, the annular stabilizer chamber 12 can also be free of struts. In other words, the annular stabilizer chamber 12 can be free of vanes and free of struts, so that neither flow-guiding vanes nor struts are present in the annular stabilizer chamber 12. Furthermore, the annular stabilizer chamber 12 is connected to the main flow channel 13 via a downstream inlet channel 15 and an upstream outlet opening 16. The annular stabilizer chamber 12 can be rotationally symmetrical.

As is shown schematically in FIG. 2, a plurality of flow-guiding elements 17 are arranged in the downstream inlet channel 15. Typically, the plurality of flow-guiding elements 17 are arranged circumferentially around a central axis 11 of the main flow channel 13. In particular, the plurality of flow-guiding elements 17 can be arranged concentrically around the central axis 11 of the main flow channel 13. It should further be noted that the flow-guiding elements 17 can be formed so as to be flush with the inlet opening 15A on the main flow channel side of the inlet channel 15 and/or flush with the outlet opening 15B on the stabilizer chamber side of the inlet channel 15. Alternatively, the flow-guiding elements 17 can be spaced apart from the inlet opening 15A on the main flow channel side of the inlet channel 15 and/or from the outlet opening 15B on the stabilizer chamber side of the inlet channel, as is shown by way of example in FIG. 2. The downstream inlet channel 15 is arranged between an upstream part 141 of the annular web 14 and a downstream part 142 of the annular web 14.

In the present disclosure, the term "inlet channel" is to be understood as meaning a channel which serves as the flow inlet channel into the stabilizer chamber. Typically, the inlet channel 15 comprises an inlet opening 15A on the main flow channel side and an outlet opening 15B on the stabilizer chamber side, as is shown by way of example in FIG. 2.

In the present disclosure, the terms "downstream" and "upstream" relate to the main flow in the main flow channel in the intake region of a compressor wheel. For better understanding, the main flow direction 1 is marked in the figures. According to one example, the inlet channel 15 of the stabilizer chamber can be arranged downstream with respect to an inlet edge 24 of the compressor wheel 21, as is shown in FIG. 2. The outlet opening 16 of the stabilizer chamber is typically arranged upstream of the inlet edge 24 of the compressor wheel 21.

Figure 5:
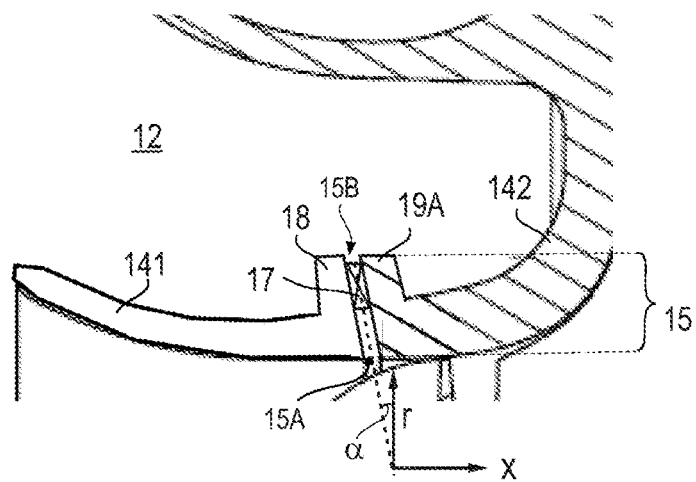
FIGS. 5 and 6 are schematic views of an inlet channel of a stabilizer channel according to further embodiments described herein.

According to one embodiment, which can be combined with other embodiments described herein, the plurality of flow-guiding elements 17 are configured and arranged so as to provide a deflection grid which can be flowed through. For example, the deflection grid can be configured and arranged so as to provide a deflection grid which can be flowed through substantially radially. In the present disclosure, the expression "substantially radially" is to be understood as meaning an angle range of $\alpha = \pm 45°$ or less, in particular of $\alpha = \pm 25°$ or less, relative to the radial direction r. As is shown by way of example in FIG. 2, the radial direction r extends perpendicularly to the central axis 11. According to one example, "substantially radially" is to be understood as meaning an angle range of $\pm 10°$ or less relative to the radial direction r. For better understanding, FIG. 5 shows by way of example an inlet channel 15 inclined at an angle $\alpha$, which falls under the above-mentioned definition of "substantially radially". The angle $\alpha$ is located in the x-r plane.

According to one embodiment, which can be combined with other embodiments described herein, the downstream inlet channel 15 extends substantially in the radial direction, as is shown by way of example in the embodiments in FIGS. 2 to 5.

Figure 6:
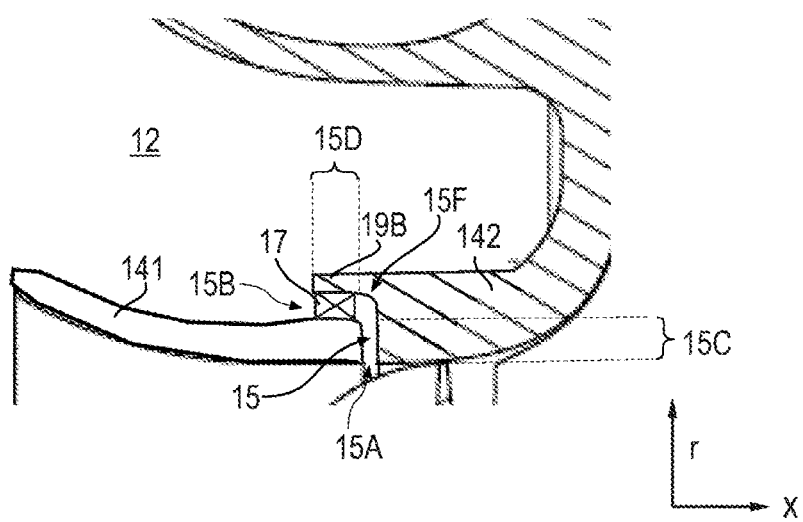

According to an alternative embodiment, which can be combined with other embodiments described herein, the plurality of flow-guiding elements 17 are configured and arranged so as to provide a deflection grid which can be flowed through substantially axially, as is shown by way of example in FIG. 6. In the present disclosure, the expression "substantially axially" is to be understood as meaning an angle range of $\pm 45°$ or less, in particular of $\pm 25°$ or less, relative to the axial direction x. As is shown by way of example in FIG. 2, the axial direction x extends along the central axis 11. According to one example, "substantially axially" is to be understood as meaning an angle range of $\pm 10°$ or less relative to the axial direction x. A deflection grid which can be flowed through substantially axially can be provided, for example, by a configuration of the inlet channel 15 of the stabilizer chamber and an arrangement of the flow-guiding elements 17 according to FIG. 6.

According to one embodiment, which can be combined with other embodiments described herein, the downstream inlet channel 15 comprises a part 15C which extends substantially radially and a part 15D which extends substantially axially, as is shown by way of example in FIG. 6. Between the part 15C which extends substantially radially and the part 15D which extends substantially axially there is typically a curved transition region 15F.

According to one embodiment, which can be combined with other embodiments described herein, the upstream part 141 of the annular web 14 comprises a first projection 18 which extends substantially in the radial direction. The downstream part 142 of the annular web 14 can likewise comprise a second projection 19A which extends substantially in the radial direction, as is shown by way of example in FIGS. 4a, 4b and 5. Alternatively, the downstream part 142 of the annular web 14 can comprise a second projection 19B which extends substantially in the axial direction, as is shown by way of example in FIG. 6.

According to one embodiment, which can be combined with other embodiments described herein, the stabilizer channel 10 is an integral part of a compressor housing, as is shown by way of example in FIG. 2.

Figure 3A:
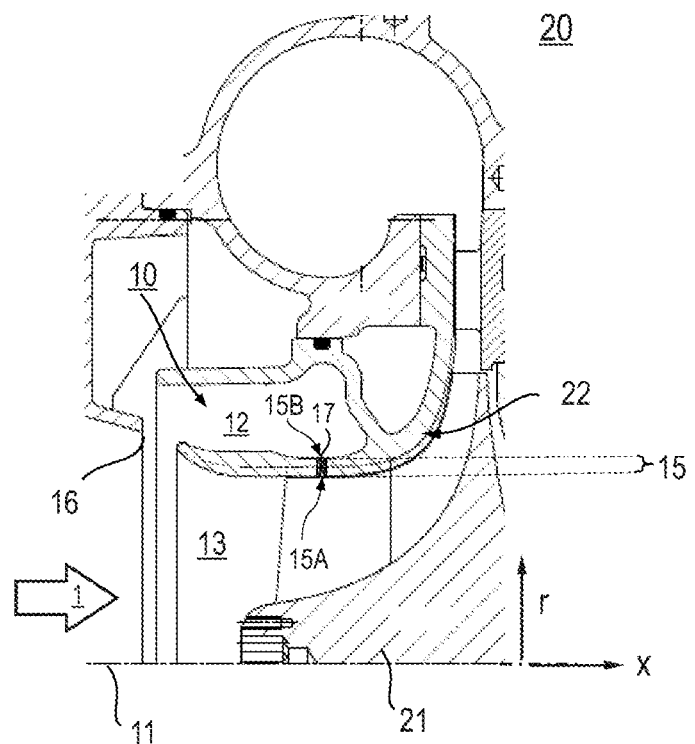
FIGS. 3a and 3b are schematic views of a stabilizer channel according to further embodiments described herein.
Figure 3B:
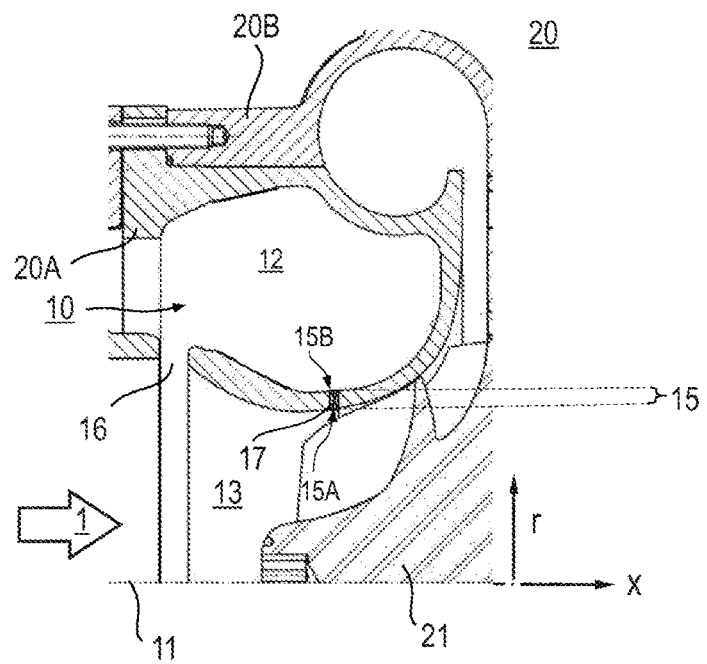

Alternatively, the stabilizer channel 10 can be integrated into an insert part 22 which can be mounted in the intake region of a compressor, as is shown by way of example in FIG. 3a. According to a further example, the stabilizer channel can be part of an inner compressor housing 20A, as is shown by way of example in FIG. 3b, in which a compressor 20 having an inner compressor housing 20A and an outer compressor housing 20B is shown.

According to one embodiment, which can be combined with other embodiments described herein, the upstream part 141 of the annular web 14 and the downstream part 142 of the annular web 14 are connected via the plurality of flow-guiding elements 17, for example by means of a screw connection. The screw connection can extend through the flow-guiding elements 17. It should be noted that the screw connections can also be produced in a different way, that is to say so that they do not extend through the flow-guiding elements 17. Alternatively or in addition, other types of connection, such as, for example, shrinkage or clamping, can also be used.

According to one embodiment, which can be combined with other embodiments described herein, the plurality of flow-guiding elements 17 are in the form of separate components. According to an alternative embodiment, which can be combined with other embodiments described herein, the plurality of flow-guiding elements 17 are formed integrally (in one piece) with the upstream part 141 of the annular web 14 and/or integrally (in one piece) with the downstream part 142 of the annular web 14.

According to one embodiment, which can be combined with other embodiments described herein, the downstream part 142 of the annular web 14 has a centering shoulder 143. Alternatively or in addition, the upstream part 141 of the annular web 14 can have a centering shoulder (not shown explicitly). The centering shoulder can be cylindrical or conical.

According to one embodiment, which can be combined with other embodiments described herein, the plurality of flow-guiding elements 17 each have a centering seat 171 which is configured so as to arrange the flow-guiding elements 17 in the inlet channel 15 circumferentially, in particular concentrically, around the central axis 11 of the main flow channel 13.

According to one embodiment, which can be combined with other embodiments described herein, at least one, in particular at least half or all, of the plurality of flow-guiding elements 17 is formed from Curtis-type vane profiles. In particular, at least one, in particular at least half or all, of the plurality of flow-guiding elements 17 can be prismatic, Curtis-type vanes. Typically, the flow-guiding elements 17 are in the form of radial deflection vanes. Forming the flow-guiding elements from Curtis-type vane profiles, in particular flow-guiding elements in the form of prismatic Curtis-type vanes, has the advantage that these can be made relatively thick, so that a better connection of the upstream part 141 of the annular web 14 to the downstream part 142 of the annular web 14 via such guiding elements is possible, for example by means of a screw connection or other suitable types of connection.

Figure 4A:
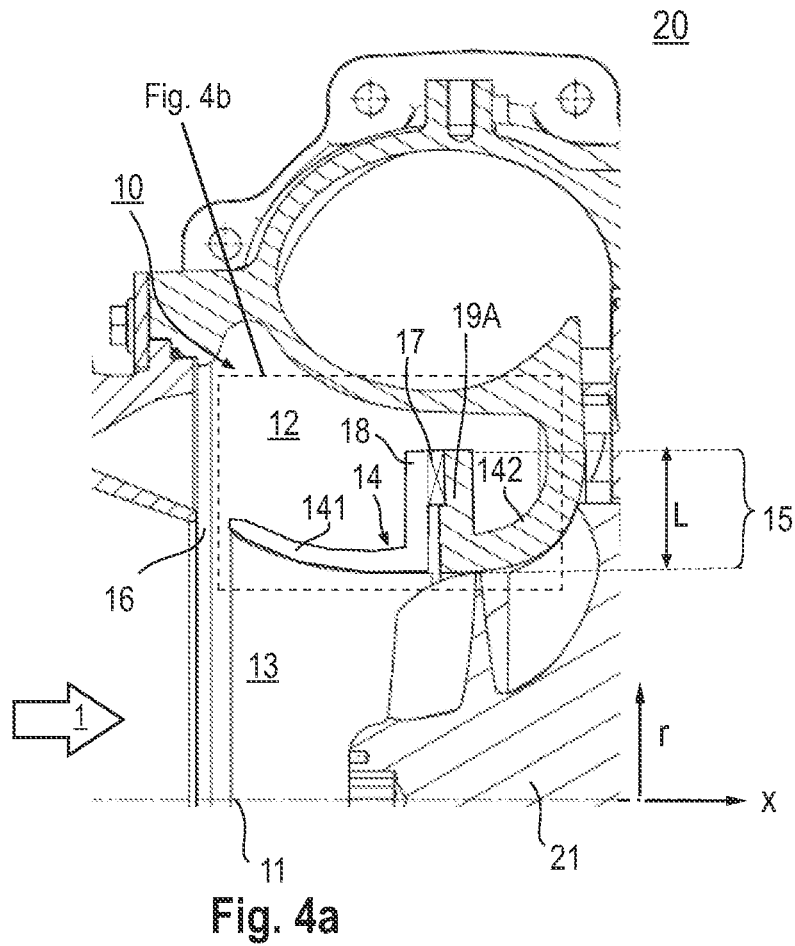
FIG. 4a is a schematic view of a stabilizer channel according to a further embodiment described herein.
Figure 4B:
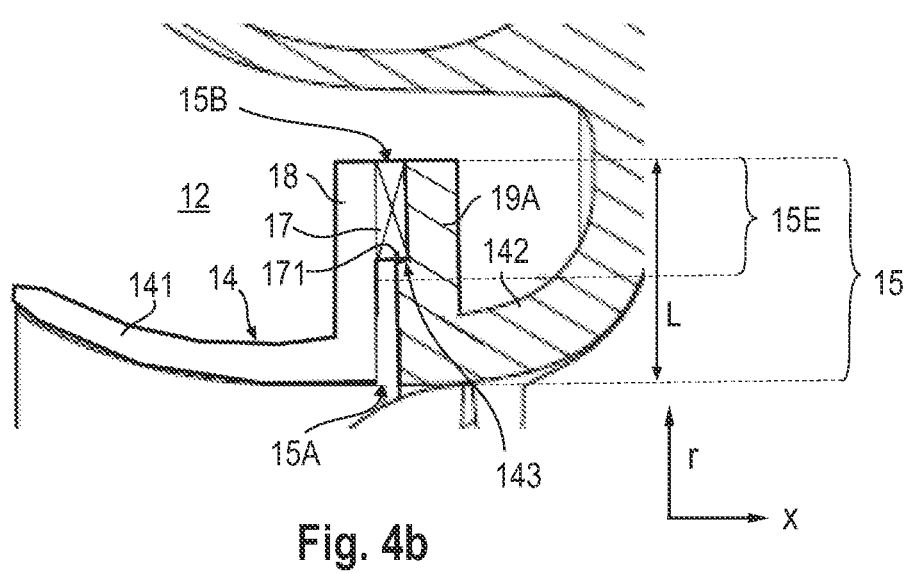

According to one embodiment, which can be combined with other embodiments described herein, the plurality of flow-guiding elements 17 are arranged in an outflow region of the inlet channel 15 of the stabilizer chamber, as is shown by way of example in FIGS. 4a and 4b. The outflow region of the inlet channel 15 is to be understood as meaning the region of the inlet channel 15 that is located on the side of the outlet opening 15B on the stabilizer chamber side. The outflow region can extend, for example, over half or less of the inlet channel length L. For better understanding, the outflow region 15E of the inlet channel 15 is shown by way of example in FIG. 4b. An arrangement of the flow-guiding elements 17 in an outflow region of the inlet channel 15 can have an advantageous effect on flow speeds and vane vibration excitation.

Figure 8:
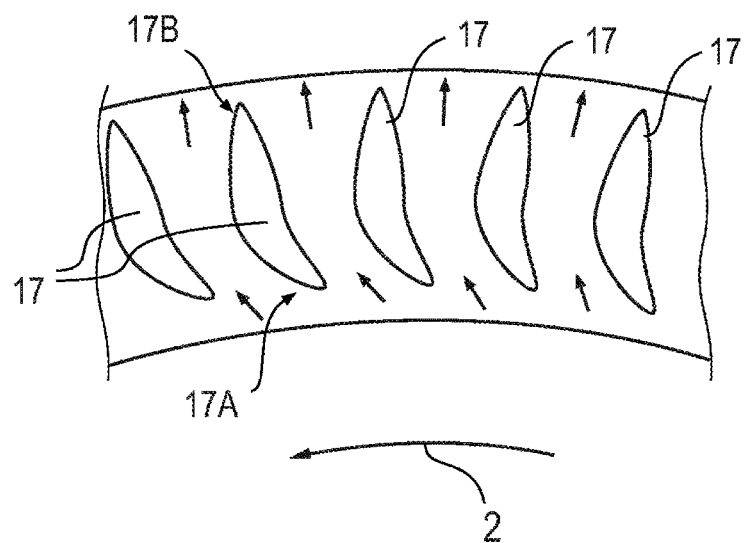

According to one embodiment, which can be combined with other embodiments described herein, the flow-guiding elements 17 each have an inflow-side end 17A and an outflow-side end 17B, wherein the respective outflow-side ends 17B of the flow-guiding elements 17 are inclined in the circumferential direction relative to the respective inflow-side ends 17A of the flow-guiding elements 17, so that a swirl is reduced as they are flowed through, as is shown by way of example in FIG. 8 by the arrows between the inflow-side ends 17A and the outflow-side ends 17B.

Figure 7:
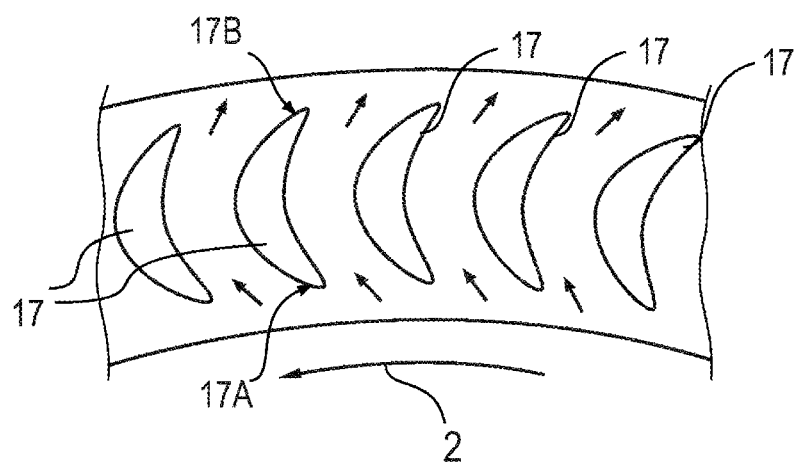

Alternatively, the respective outflow-side ends 17B of the flow-guiding elements 17 can be inclined in the circumferential direction relative to the respective inflow-side ends 17A of the flow-guiding elements 17 in such a manner that a counter-swirl is generated, as is shown by way of example in FIG. 7 by the arrows between the inflow-side ends 17A and the outflow-side ends 17B. For better understanding, the direction of rotation 2 of the compressor wheel is shown in FIGS. 7 and 8. The rotation of the compressor wheel leads to a flow that is acted upon by swirl.

According to a second aspect of the present disclosure there is provided a compressor, in particular a radial compressor or a diagonal compressor, which comprises a compressor wheel 21 and a stabilizer channel 10 according to one of the embodiments described herein. According to one embodiment, which can be combined with other embodiments described herein, the compressor wheel 21 comprises in the region of the inlet opening 15A a number $N_1$ of compressor wheel vanes 23. A number $N_2$ of guiding elements in the downstream inlet channel 15 is $N_2 \geq 1.5 \times N_1$. This is advantageous for reducing noise and vibration development during operation of the compressor.

A third aspect of the invention relates to a turbocharger having a compressor according to one of the embodiments described herein, so that a turbocharger which is improved over the prior art is advantageously provided.

LIST OF REFERENCE SIGNS 1 main flow direction
2 direction of rotation of the compressor wheel
5 compressor housing
10 stabilizer channel
11 central axis/axis of rotation of the compressor wheel
12 annular stabilizer chamber 121 strut
13 main flow channel
14 annular web
141 upstream part of the annular web
142 downstream part of the annular web
143 centering shoulder
15 inlet channel of the stabilizer chamber
15A inlet opening of the inlet channel on the main flow channel side
15B outlet opening of the inlet channel on the stabilizer chamber side
15C part of the inlet channel which extends substantially radially
15D part of the inlet channel which extends substantially axially
15E outflow region of the inlet channel
15F transition region
16 outlet opening of the stabilizer chamber
17 flow-guiding elements
17A inflow-side end of the flow-guiding elements
17B outflow-side end of the flow-guiding elements
18 first projection which extends substantially in the radial direction
19A second projection which extends substantially in the radial direction
19B second projection which extends substantially in the axial direction
20 compressor
20A inner compressor housing
20B outer compressor housing
21 compressor wheel
22 insert part
23 compressor wheel vanes
24 inlet edge of the compressor wheel
r radial direction
x axial direction
L length of the inlet channel
α angle in the x-r plane to explain "substantially radially"

The invention claimed is:

1. A stabilizer channel of a compressor, the stabilizer channel comprising:
    an annular stabilizer chamber which surrounds a main flow channel in the intake region of a compressor wheel, the annular stabilizer chamber delimited with respect to the main flow channel by an annular web, the annular web having a first surface that defines a portion of the annular stabilizer chamber,
    wherein the annular stabilizer chamber is free of vanes and connected via a downstream inlet channel and an upstream outlet opening,
    wherein a plurality of flow-guiding elements are arranged in the downstream inlet channel, and
    wherein the downstream inlet channel is arranged between an upstream part of the annular web and a downstream part of the annular web,
    wherein at least one of the following applies:
        (i) the upstream part of the annular web comprises a first projection and the downstream part of the annular web comprises a second projection, wherein the first projection and the second projection extend away from the first surface of the annular web in the radial direction and into the annular stabilizer chamber, or
        (ii) the downstream part of the annular web comprises a third projection which extends in the axial direction into the annular stabilizer chamber such that the third projection overlaps a portion of the upstream part of the annular web, thereby forming the downstream inlet channel having a curved transition region.

2. The stabilizer channel as claimed in claim 1, wherein the plurality of flow-guiding elements are configured and arranged to provide a deflection grid which can be flowed through.

3. The stabilizer channel as claimed in claim 1, wherein the downstream inlet channel extends substantially in the radial direction, or wherein the downstream inlet channel comprises a part which extends substantially radially and a part which extends substantially axially.

4. The stabilizer channel as claimed in claim 1, wherein the plurality of flow-guiding elements are arranged circumferentially around a central axis of the main flow channel.

5. The stabilizer channel as claimed in claim 1, wherein the stabilizer channel is an integral part of a compressor housing, or wherein the stabilizer channel is integrated into an insert part which can be mounted in the intake region of a compressor, or wherein the stabilizer channel is part of an inner compressor housing.

6. The stabilizer channel as claimed in claim 1, wherein the upstream part of the annular web and the downstream part of the annular web are connected via the plurality of flow-guiding elements.

7. The stabilizer channel as claimed in claim 1, wherein the plurality of flow-guiding elements are in the form of separate components.

8. The stabilizer channel as claimed in claim 1, wherein the plurality of flow-guiding elements are formed integrally with at least one of the upstream part of the annular web and with the downstream part of the annular web.

9. The stabilizer channel as claimed in claim 1, wherein at least one of the downstream part of the annular web and the upstream part of the annular web have a centering shoulder.

10. The stabilizer channel as claimed in claim 1, wherein the plurality of flow-guiding elements each have a centering seat which is configured so as to arrange the flow-guiding elements in the downstream inlet channel circumferentially around the central axis of the main flow channel.

11. The stabilizer channel as claimed in claim 1, wherein at least one of the plurality of flow-guiding elements are formed from at least one of Curtis vane profiles and prismatic Curtis vanes.

12. The stabilizer channel as claimed in claim 1, wherein the plurality of flow-guiding elements are arranged in an outflow region of the downstream inlet channel of the stabilizer chamber.

13. The stabilizer channel as claimed in claim 1, wherein the flow-guiding elements each have an inflow-side end and an outflow-side end, wherein the outflow-side ends of the flow-guiding elements are inclined in the circumferential direction relative to the inflow-side ends of the flow-guiding elements, so that a swirl is reduced or a counter-swirl is generated as they are flowed through.

14. A compressor comprising a compressor wheel and a stabilizer channel, the stabilizer channel comprising an annular stabilizer chamber which surrounds a main flow channel in the intake region of the compressor wheel,
    wherein the annular stabilizer channel is delimited with respect to the main flow channel by an annular web, the annular web having a first surface that defines a portion of the annular stabilizer chamber,
    wherein the annular stabilizer chamber is free of vanes and connected via a downstream inlet channel and an upstream outlet opening, wherein a plurality of flow-guiding elements are arranged in the downstream inlet channel, and wherein the downstream inlet channel is arranged between an upstream part of the annular web and a downstream, part of the annular web, wherein at least one of the following applies:
  i) the upstream part of the annular web comprises a first projection and the downstream part of the annular web comprises a second projection, wherein the first projection and the second projection extend away from the first surface of the annular web in the radial direction and into the annular stabilizer chamber, or
  (ii) the downstream part of the annular web comprises a third projection which extends in the axial direction into the annular stabilizer chamber such that the third projection overlaps a portion of the upstream part of the annular web, thereby forming the downstream inlet channel having a curved transition region.

15. A turbocharger comprising:

a compressor comprising a compressor wheel and a stabilizer channel, the stabilizer channel comprising an annular stabilizer chamber which surrounds a main flow channel in the intake region of the compressor wheel, wherein the annular stabilizer chamber is delimited with respect to the main flow channel by an annular web, the annular web having a first surface that defines a portion of the annular stabilizer chamber, wherein the annular stabilizer chamber is free of vanes and connected via a downstream inlet channel and an upstream outlet opening, wherein a plurality of flow-guiding elements are arranged in the downstream inlet channel, and wherein the downstream inlet channel is arranged between an upstream part of the annular web and a downstream part of the annular web, wherein at least one of the following applies:
  (i) the upstream part of the annular web comprises a first projection and the downstream part of the annular web comprises a second projection, wherein the first projection and the second projection extend away from the first surface of the annular web in the radial direction and into the annular stabilizer chamber, or
  (ii) the downstream part of the annular web comprises a third projection which extends in the axial direction into the annular stabilizer chamber such that the third projection overlaps a portion of the upstream part of the annular web, thereby forming the downstream inlet channel having a curved transition region.

16. The stabilizer channel as claimed in claim 1, wherein the plurality of flow-guiding elements are configured and arranged to provide a deflection grid which can be flowed through substantially radially or substantially axially.

17. The stabilizer channel as claimed in claim 1, wherein at least half of the plurality of flow-guiding elements are formed from at least one of Curtis vane profiles- and prismatic Curtis vanes.

18. The stabilizer channel as claimed in claim 1, wherein the compressor is a radial compressor or a diagonal compressor.

19. The compressor of claim 14, wherein the compressor wheel comprises, in the region of an inlet opening of the downstream inlet channel, a number $N_1$ of compressor wheel vanes, and a number $N_2$ of the flow-guiding elements, wherein $N_2 \geq 1.5 \times N_1$.

20. The compressor of claim 14, wherein the compressor is a radial compressor or a diagonal compressor.

* * * * *